Oct. 20, 1964   W. L. BRYAN ETAL   3,153,684
FLAME TREATMENT OF POLYVINYL FLUORIDE FILM
Filed July 18, 1962
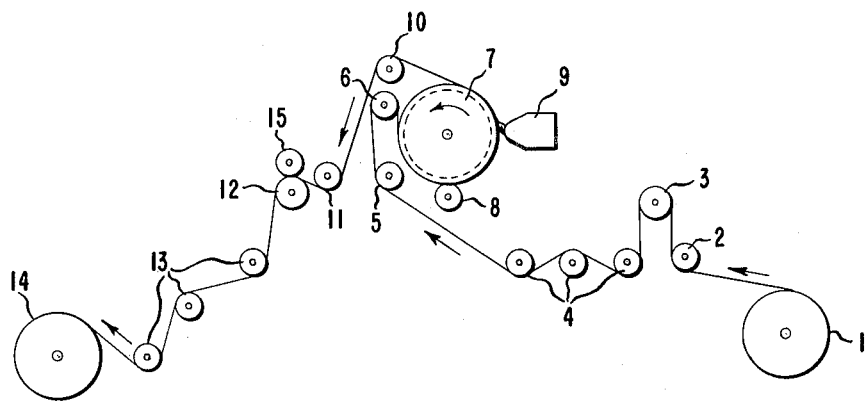
INVENTORS
WILLIAM LOCKE BRYAN
DONALD EUGENE SWARTS
BY  C. Ralph Snyder.
ATTORNEY

United States Patent Office 3,153,684
Patented Oct. 20, 1964

3,153,684
FLAME TREATMENT OF POLYVINYL
FLUORIDE FILM
William Locke Bryan, Tonawanda, and Donald Eugene
Swarts, Grand Island, N.Y., assignors to E. I. du Pont
de Nemours and Company, Wilmington, Del., a corporation of Delaware
Filed July 18, 1962, Ser. No. 210,790
3 Claims. (Cl. 264—80)

This invention relates to the surface treatment of thermoplastic film, and more particularly to the flame treatment of polyvinyl fluoride film to modify the surface adherence characteristics thereof.

Polyvinyl fluoride is noted for its attractive properties, and in film form possesses an unusual combination of excellent resistance to outdoor weathering exposures, a high degree of physical toughness, chemical inertness, abrasion resistance, resistance to soiling and the action of solvents as well as an amazing retention of these properties at both low and elevated temperatures. The above combination of properties not only suggests many areas of use for polyvinyl fluoride in the form of self-supporting films, but also the use of such films as the outer layers of a wide variety of laminar structures destined chiefly for outdoor use wherein the polyvinyl fluoride films serve to upgrade less functional substrates, imparting to the final structure a degree of utility not to be found solely in either film or substrate.

Because of their comparatively low cost and high strength-to-weight ratio, reinforced plastics, particularly those based on glass fiber-reinforced polyester systems are rapidly replacing other materials of construction in the manufacture of many shaped structures which are currently articles of commerce. A serious deficiency of glass fiber-reinforced polyester structures, however, is their poor resistance to the ravages of weathering. This deficiency manifests itself in the form of surface erosion of the structure causing a loosening and raising of the reinforcing fibers near the surface. Not only is the resulting fuzzy appearance unsightly from an esthetic point of view but the raised fibers provide multiple paths for the ingress of water into the body of the structure, thus accelerating hydrolytic degradation.

It has been proposed to eliminate this deficiency through the use of preformed polyvinyl fluoride films, previously rendered suitably surface receptive, as mold release sheets in the production of fiber-reinforced polyester structures during the cure of which the polyvinyl fluoride layer becomes integrally bonded to the fiber-reinforced polyester structure (i.e., without an intermediate adhesive layer). While the methods previously described for rendering polyvinyl fluoride films surface-receptive and hence suitable for use in the preparation of polyvinyl fluoride film-clad, fiber-reinforced polyester structures will result in initially strong, unpeelable bonds between film and polyester, these bonds do not exhibit the long term hydrolytic stability deemed essential for satisfactory commercial exploitation of the outstanding outdoor weathering characteristics of these composite structures.

It is an object of this invention, therefore, to provide a process for the flame treatment of polyvinyl fluoride film whereby to render such film strongly adherent to fiber-reinforced polyester structures even under condition of high moisture. A further object of this invention is to provide a process for improving surface characteristics of polyvinyl fluoride film by flame treatment. A still further object of this invention is to provide a process for the flame treatment of preformed polyvinyl fluoride films which will permit their employment as mold release sheets in the production of fiber-reinforced polyester structures, during the cure of which the polyvinyl fluoride layer becomes integrally bonded to the fiber-reinforced polyester structure, the film-to-polyester bond exhibiting resistance to hydrolytic attack to a degree not obtainable by other flame treatment techniques. These and other objects will more clearly appear hereinafter.

The foregoing objects are realized by the present invention which comprises in combination the sequential steps of: (1) bringing a surface of polyvinyl fluoride film continuously into intimate contact with a moving, relatively highly thermally conductive surface maintained at a temperature effective to bring the film passing thereover to a bulk temperature within the range of from 40° C. to 135° C.; (2) passing said film while in contact with said surface through the stable, self-sustaining flame of a burner disposed parallel to said film and transversely of the direction of travel thereof, said burner being supplied with a gaseous mixture consisting essentially of a hydrocarbon fuel, oxygen and nitrogen, said fuel being selected from the group consisting of paraffinic and olefinic hydrocarbons, the fuel equivalence ratio of said gaseous mixture ranging from 1.05 to 1.20, the oxygen ratio of said gaseous mixture ranging from 0.15 to 0.25, the distance from the surface of the film to the discharge opening of said burner being greater than the length of the unimpeded primary envelope of said flame, said thermally conductive surface opposite the flame being maintained at said temperature within the range of from 40° C. to 135° C., the exposure of the film to the action of said flame being for a time between 0.01 second and 0.5 second; and (3) maintaining said film in contact with said moving, relatively highly thermally conductive surface for a time after passage of said film through said flame, whereby to render said film adherent to fiber-reinforced polyester structures.

The expression "fuel equivalence ratio," employed herein in defining the gaseous mixture applied to the burner, is the ratio of the amount of hydrocarbon fuel present in the gaseous mixture supplied to the burner to the amount of hydrocarbon fuel necessary for complete stoichiometric combustion. The term "stoichiometric" characterizes a proportion of substances (or energy) exactly right for a specific chemical reaction with no excess of any reactant or product.

The expression "oxygen ratio" is the ratio of the total amount of oxygen present in the gaseous mixture supplied to the burner to the total amount of non-fuel components in the mixture, said components including chiefly oxygen and nitrogen.

The "primary envelope" of a stable, self-sustaining flame used in carrying out the process of this invention is readily discerned as the luminous, pale blue inner portion of the flame nearer the discharge opening of the burner (roughly conical in shape for a circular discharge opening and wedge-shaped for a rectangular discharge opening) and is readily distinguished from the fainter, less luminous secondary sheath or envelope surrounding it. By "the length of the unimpeded primary envelope" is meant the distance from the discharge opening of the burner to the tip of the primary envelope of the flame when the burner is so positioned that the flame burns freely and the primary envelope is not distorted by impingement on any surface or by the proximate passage of any surface.

In order to render polyvinyl fluoride films adherable to in situ-cured, fiber-reinforced polyester structures with a degree of adherability highly resistant to hydrolytic attack, it has been found necessary to raise the bulk temperature of the film to within a specific range prior to subjecting the film to the action of a stable, self-sustaining flame. Further, it has been unexpectedly discovered that not just any flame will do. The flame must be one supported by a gaseous mixture of a hydrocarbon fuel (preferably selected from normally gaseous paraffins and olefins), oxygen and nitrogen, ranging on the rich side of stoichiometric from the fuel standpoint. It has further been found necessary to pass the film through the flame sufficiently out of contact with the primary envelope thereof as to preclude any substantial distortion of the primary envelope. Although the mechanism by which successful treatment according to the process of this invention is accomplished is not fully understood, it has been found essential that the film surface to be treated be passed through the secondary envelope or sheath of the flame.

Propane is the preferred hydrocarbon fuel for carrying out the process of this invention from the combined standpoints of cost, availability and ease of both storage and use. Pure propane is logically preferred from the standpoint of uniformity of fuel supply. However, commercial propanes, known to contain substantial quantities of propylene or ethane and mixed butanes, depending on the source, have been employed routinely. Other normally gaseous paraffinic and olefinic hydrocarbons and mixtures thereof have likewise been successfully employed.

A critical factor in carrying out the process of this invention is that it is necessary to maintain the fuel equivalence ratio of the gaseous mixture supplied to the burner within narrow limits ranging on the rich side of stoichiometric. Specifically, the fuel equivalence ratio may range from 1.05 to 1.20. Simultaneously, the oxygen ratio of the non-fuel components of the gaseous mixture must also be maintained within relatively narrow limits. Specifically, the oxygen ratio may range from 0.15 to 0.25. Preferably the process of this invention is carried out while maintaining the fuel equivalence ratio in the range of 1.08 to 1.15 and the oxygen ratio at 0.21. This oxygen ratio exists when air alone constitutes the non-fuel components of the gaseous mixture. Oxygen ratios below 0.21 are obtained by diluting air with additional nitrogen. Oxygen ratios above 0.21 are obtained by enriching air with additional oxygen.

A further critical factor of the process of this invention is that the bulk temperature of the film must be raised to within a specific range, i.e., from about 40° C. to about 135° C. prior to passing through the flame. When the average water temperature flowing through the back-up roll rises much above about 135° C., film shrinkage occurs to such an extent that the physical properties of the treated film are adversely affected.

For maximum effectiveness of treatment it is preferred that the time of passage of the film through the secondary sheath of the flame be at least about 0.01 second and preferably in the range of 0.025 second to 0.4 second. Successful treatments have been carried out with times of passage of the film through the flame of up to 0.5 second.

Polyvinyl fluoride films which are to be treated by the process of this invention may be manufactured by a variety of methods. A particularly useful and preferred method for making polyvinyl fluoride films consists of the steps of feeding a latent solvent/particulate polyvinyl fluoride mixture to a heated extruder which is connected to a slotted casting hopper, from whence a tough, coalesced solvent-containing polyvinyl fluoride film is continuously extruded. This latent solvent-containing film is then stretched longitudinally over heated rolls and then transversely in a tenter frame, in which it is held in restraint while the remaining latent solvent is volatilized. These extrusion and stretching procedures are described in detail in U.S. Patent 2,953,818. If desired, various color and/or opacity effects can be achieved by incorporating suitable pigments in the polyvinyl fluoride/latent solvent mixtures being fed to the extruder. Polyvinyl fluoride films containing ultraviolet light screening agents such as polymeric ortho-hydroxybenzophenones have been found particularly useful where the decorative effect of a clear film over a substrate is desired. Polyvinyl fluoride films may also be prepared by casting onto suitably smooth surfaces any of the more fluid latent solvent/particulate polyvinyl fluoride compositions described in U.S. Patents 3,000,843 and 3,000,844, followed by heating to coalesce the polymer particles into a unitary film and subsequently heating to volatilize the remaining latent solvent.

Where the curing of the fiber-reinforced polyester structures is to be carried out in the rather higher temperature ranges, e.g., above 80° C., smooth-surfaced, polyvinyl fluoride film-clad structures may be obtained by employing biaxially oriented polyvinyl fluoride films which exhibit some finite shrinkage when exposed for thirty minutes in a circulating air oven maintained at 60° C., preferably from about 0.2% to about 5.0% in each direction. If a decorative wrinkled or crackle-finished polyvinyl fluoride film-clad polyester structure is desired, polyvinyl fluoride films which do not exhibit finite shrinkage at 60° C. may be employed when curing in the higher temperature ranges. It should be noted that polyvinyl fluoride films which do not exhibit any finite shrinkage at 60° C. whether they be oriented or unoriented films may be successfully treated in accordance with the process of this invention and employed to produce smooth-surfaced, polyvinyl fluoride film-clad polyester structures if the curing is carried out at substantially lower temperatures, for example below about 60° C.

A convenient and efficient arrangement of apparatus with which the process of this invention may be carried out is shown schematically in the single figure of the accompanying drawing. Referring to said figure, polyvinyl fluoride film to be flame treated unwinds under substantially constant tension from supply roll 1 and is conducted through a train of rolls consisting of a metal idler roll 2, a driven rubber-covered tension isolation roll 3 and three more metal idler rolls 4. From there the film passes over rubber-covered idler roll 5 (and optionally also over rubber-covered idler roll 6) whereby it substantially reverses its direction of travel and is brought into contact with driven thermally conductive (metal) treating back-up roll 7 which is equipped in conventional manner (not shown) for the passage therethrough of heat transfer fluid (usually water). Once in contact with back-up roll 7, the film then passes under idling rubber-covered nipping roll 8 which serves to minimize wrinkling and press out entrapped air which substantially improves the uniformity of contact of the film with back-up roll 7 as it passes burner 9.

An elongated burner presenting a relatively wide flame front, as measured in the direction of film travel is preferred for use in carrying out the process of this invention. A burner wherein the discharge opening comprises six longitudinal rows of 1/16 inch diameter holes spaced on 1/8 inch centers in an equilateral triangular pattern, provides a suitably wide flame front. After the treated film leaves back-up roll 7 it passes under metal idler roll 11 (or optionally over metal idler roll 10 and under metal idler roll 11 in sequence), then over driven metal tension isolation roll 12 and finally through a train of metal idler rolls 13 to driven wind-up roll 14. Tension isolation roll 12 is equipped for the passage therethrough of coolant (usually water) and idling rubber-covered nipping roll 15 reduces film slippage on roll 12 and insures good heat transfer contact of the film with roll 12. When only idler roll 5 is used in bringing the untreated film initially into contact with back-up roll 7, the treated film may be taken off back-up roll 7 either under idler roll 11 alone or optionally over idler roll 10 and under idler roll 11 in sequence. When idler rolls 5 and 6 are used in sequence in bringing the untreated film into contact with back-up roll 7, the treated film is taken off back-up roll 7 over idler roll 10 and under idler roll 11 in sequence.

In the manufacture of fiber-reinforced polyester structures clad with polyvinyl fluoride films treated in accordance with the process of this invention, a mixture consisting essentially of (1) at least one organic linear polymeric ester containing recurring ethylenic unsaturation; (2) at least on addition-polymerizable, ethylenically unsaturated organic monomer; and (3) reinforcing fibers, is subjected (in a suitably lined mold) to addition-polymerization conditions effective to produce a cured structure. Unsaturated polymeric esters suitable for use in the preparation of such fiber-reinforced polymeric structures in combination with polyvinyl fluoride films treated by the process of this invention are those now being employed commercially, and are commonly prepared by condensing under polymerizing conditions, either (1) an ethylenically unsaturated dicarboxylic acid with a diol containing no ethylenic unsaturation, (2) a dicarboxylic acid containing no ethylenic unsaturation with an ethylenically unsaturated diol or, and most commonly, (3) a mixture of ethylenically unsaturated dicarboxylic acids, and dicarboxylic acids containing no ethylenic unsaturation, with a diol containing no ethylenic unsaturation. Where stable dichlorides, diesters, or anhydrides of the dicarboxylic acids are available, they can be and are often substituted therefor. Among the ethylenically unsaturated dicarboxylic acids or derivatives thereof which are commonly employed can be mentioned fumaric acid, maleic acid and its anhydride, citraconic acid, mesaconic acid, itaconic acid and endomethylene tetrahydrophthalic acid. Among the dicarboxylic acids or derivatives thereof containing no ethylenic unsaturation which are commonly employed can be mentioned phthalic acid and its anhydride, adipic acid, sebacic acid, isophthalic acid, terephthalic acid, malonic acid and glutaric acid. A frequently employed ethylenically unsaturated diol is 2-butene-1, 4-diol while among the commonly employed diols containing no ethylenic unsaturation can be mentioned ethylene glycol, propylene glycol, diethylene glycol and dipropylene glycol. As will be obvious to those skilled in the art, varying the proportion and nature of the ethylenically saturated and unsaturated reactants in these condensations affects the number of carbon-to-carbon double bonds in a given polymer chain length available for cross-linking by addition-polymerization means.

Among the addition-polymerizable compounds most commonly employed as cross-linking agents in combination with the above-described polyesters in the manufacture of fiber-reinforced polymeric structures can be mentioned styrene, diallyl phthalate, methyl methacrylate and triallyl cyanurate. Other ethylenically unsaturated cross-linking agents more or less frequently employed in these operations include alpha-methylstyrene, divinyl benzene, vinyl toluene, allyl diglycolate, methyl acrylate, ethyl acrylate, ethyl methacrylate, vinyl acetate, ethyl acrylate, ethyl methacrylate, vinyl acetate, acrylonitrile, diallyl maleate, vinyl phenol and allyl carbamate. Frequently more than one of the above cross-linking agents is employed in the same mixture, depending on the properties desired in the final structure and its ultimate use.

While asbestos, nylon, cellulosic and like mineral and organic fibers can be incorporated in the mixtures employed in making the desired structures, glass reinforcing fibers are preferred, particularly from the strength-versus-cost standpoint. Fibrous glass is available for reinforcing structures in the form of cloth, yarns, mats, rovings, milled fibers, parallel strands, surfacing mats and loose fibers. The selection of the particular form in which the glass fibers are to be used and the quantity thereof in proportion to the other ingredients in the mixture permits wide latitude and is a further means of varying the properties of the final structure in addition to varying the proportions and specific nature of the polyester and cross-linking agents respectively.

Fillers such a pigments, clays, mica, silica, talc, etc., can be incorporated into the mixtures prior to curing. While some of the addition-polymerization cross-linking reactions proceed spontaneously at normal temperatures, heat is frequently used to accelerate the reaction. Accelerators or promoters such as cobalt naphthenate, phenyl phosphinic acid, p-toluene sulfonic acid and some tertiary amines, e.g., dimethyl aniline, etc. are also frequently employed. Catalytic initiators such as benzoyl peroxide, t-butyl peroxide, di-t-butyl peroxide, methyl ethyl ketone peroxide, cyclohexane peroxide, organic azo compounds, and lauryl peroxide are also frequently employed to insure reactivity within a reasonable time. Ultraviolet light absorbing compounds and antioxidants can also be frequently incorporated into these mixtures.

The composite structures resulting from the use of polyvinyl fluoride films treated by the process of this invention can be made by any of the commonly employed low pressure molding techniques including vacuum-bag, pressure-bag and matched metal dies. The addition-polymerization cross-linking reactions are generally quite exothermic and some care is usually taken to prevent the temperatures of the reacting mass from rising so high as to boil off the cross-linking monomer before it has had an opportunity to completely react. The specific duration and temperature history of the cure will depend on many variables including the propertions and specific natures of the reacting ingredients and catalysts as well as, in some cases, the physical bulk of the reacting mass.

In the examples which follow, the polyvinyl fluoride films treated in specific embodiments of this invention and those treated as control films were evaluated by the following procedure: A 12-inch by 12-inch sample of the polyvinyl fluoride film was placed, treated side up, on a flat glass plate and a dam formed around its four edges with a length of 1/16-inch diameter twine. A major portion of a degassed blend of the polyester resin formulation was then poured onto the polyvinyl fluoride film and allowed to flow and spread evenly over the area bounded by the twine. A 12-inch by 12-inch sample of chopped strand fiber glass mat weighing approximately two ounces was placed in the polymerizable polyester layer and the remainder of the polyester resin formulation poured over the top of the mat. After the resin mixture had welled up through the interstices of the mat and spread evenly in the area bounded by the twine, a slip sheet of uncoated cellophane, untreated polyvinyl fluoride film, untreated polyethylene terephthalate film or a perfluorocarbon film such as can be fabricated from "Teflon"[1] fluorocarbon resins was placed on top, followed by another glass plate of sufficient size and thickness to place the entire area under a pressure of approximately 0.04 lb./in.$^2$. The entire sandwich was then placed in an oven and subjected to the curing cycle found most nearly optimum for the particular polyester resin formulation employed.

Polyester resin formulations A and B, both typical of those used commercially in this industry, were employed interchangeably in evaluating the process of this invention. Polyester resin formulation A is as follows:

160.0 grams of a mixture consisting of about 20% by weight of methyl methacrylate and about 80% by weight of an unsaturated polyester formed by reacting a slight stoichiometric excess of ethylene glycol with a mixture consisting of about 60 mol percent of phthalic acid and about 40 mol percent maleic anhydride.

40.0 grams of styrene.

1.0 gram of benzoyl peroxide.

0.1 gram of a solution consisting of about 6 parts by weight of cobalt naphthenates and about 51 parts by weight of naphthenic acids dissolved in about 43 parts by weight of mineral spirits.

1.0 gram of a 60% solution of methyl ethyl ketone hydroperoxide in dimethyl phthalate.

Polyester resin formulation B, particularly useful in the lower temperature curing ranges, is as follows:

160.0 grams of a mixture consisting of about 20%

---
[1] Du Pont registered trademark.

by weight of styrene and 80% by weight of an unsaturated polyester formed by reacting a slight stoichiometric excess of ethylene glycol with a mixture consisting of about 60 mol per cent of phthalic acid and about 40 mol percent of maleic anhydride.

40.0 grams of styrene.

1.0 gram of benzoyl peroxide.

0.15 gram of a solution consisting of about 6 parts by weight of cobalt naphthenates and about 51 parts by weight of naphthenic acids dissloved in about 43 parts by weight of mineral spirits.

2.2 grams of a 60% solution of methyl ethyl ketone hydroperoxide in dimethyl phthalate.

When polyester resin formulation A was employed, the "sandwich" hereinbefore described was placed in an oven maintained at 100° C. for 15 minutes, then in an oven maintained at 115° C. for 7 minutes at which time the slip sheet and both glass plates were removed and the polyvinyl fluoride film-clad, glass fiber-reinforced polyester panel subjected to a post cure of 10 minutes in an oven maintained at 150° C.

When polyester resin formulation B was employed, the "sandwich" hereinbefore described was placed in an oven maintained at 100° C. for 45 minutes at which time the slip sheet and both glass plates were removed and the polyvinyl fluoride film-clad, glass fiber-reinforced polyester panel subjected to a post cure of 10 minutes in an oven maintained at 150° C.

The bond of the polyvinyl fluoride film to the polyester structure was evaluated initially and at intervals of 1, 2, 4, 12, 24 and 48 hours and finally after one week during which the panel was completely immersed in boiling water. At these intervals, the bond strength was tested while the panels were still wet. Both the initial and periodic examinations involve making two parallel cuts 1/16-inch apart and about 1-inch long with a No. 10 Exacto Knife blade, the cuts penetrating the entire depth of the polyvinyl fluoride film. A No. 10 Exacto Knife blade was then used in an attempt to pry up the film strip at the approximate mid-point of the inch-long cut. If the film strip could be lifted, tweezers were employed in an attempt to peel it back. The results are rated as follows:

| Boiling Rating: | Explanation |
|---|---|
| 2 | Cannot lift film or start peel. |
| 1 | Film strip can be lifted and can be peeled 1/4 inch or less before it breaks. |
| 0 | Film strip can be lifted and peeled more than 1/4 inch. |

A fresh pair of parallel cuts was made at each examination interval. Since there were eight examinations made per panel, the maximum possible cumulative Boil Rating at the end of one week's immersion in boiling water would be $2 \times 8 = 16$.

The illustrative examples which follow, presented in tabular form, were carried out on the equipment schematically shown in the accompanying drawing using a 53-inch long burner of the preferred design hereinabove described. The pigmented white films contained about 15% by weight of rutile titania; the gray film about 9% by weight of rutile titania and about 3% by weight of other coloration pigments. Biaxially oriented polyvinyl fluoride films, preferred for their greater physical toughness, were employed throughout the examples. The film path through the apparatus employed for all examples consisted of rolls 5, 7 10 and 11 in sequence.

*Table I*

| Examples | 1 | 2 | 3 | 4 | 5 | 6 |
|---|---|---|---|---|---|---|
| Film description | NP White | NP White | NP | NP | Gray | White. |
| Thickness, mils | 1.0   1.5 | 1.0   1.5 | 1.0 | 1.0 | 1.5 | 1.0. |
| Hydrocarbon fuel | Propane [2] | Propane [2] | Propane [3] | Propane [1] | Methane | Propylene. |
| Fuel equivalence ratio | 1.05 | 1.10 | 1.10 | 1.10 | 1.10 | 1.10. |
| Oxygen ratio | 0.21 | 0.21 | 0.21 | 0.21 | 0.21 | 0.21 |
| Total gas rate, s.c.f./m | 12.5 | 12.6 | 12.6 | 12.6 | 15.6 | 15.6. |
| Film speed, ft./min | 50 | 50 | 50 | 50 | 50 | 50. |
| Residence time in flame, sec | 0.10 | 0.10 | 0.10 | 0.10 | 0.20 | 0.10. |
| Length of unimpeded primary envelope, mm | 3.5 | 3.5 | 3.5 | 3.5 | 3.9 | 3.7. |
| Film-to-burner distance, mm | 5.5 | 5.5 | 4.0 | 4.0 | 4.5 | 5.0. |
| Back-up roll water temp., °C. in/out | 45/51 | 45/51 | 70/75 | 110/114 | 45/50 | 45/52. |
| Evaluation: Boil rating* | 6    11 | 8    13 | 13 | 14 | 14 | 14. |

*Cumulative at end of one week; maximum possible=16.
NP=non-pigmented.
[1] C.P. Propane.
[2] "PYROFAX" brand propane; natural gas derivative (Linde Co.)—96.5% propane, 2.5% ethane and 1.0% butanes.
[3] "PROTANE" brand propane; petroleum derivative (Protane Corp.)—93% propane and 7% propylene.
S.c.f./m.=standard cubic feet per minute.

*Table II*

| Examples | 7 | 8 | 9 | 10 | 11 | 12 |
|---|---|---|---|---|---|---|
| Film description | NP** | NP** | NP** | White | White | White. |
| Thickness, mils | 1.0 | 1.0 | 1.0 | 1.5 | 1.5 | 1.5. |
| Hydrocarbon fuel | Propane [1] | Propane [1] | Propane [1] | Propane [3] | Propane [2] | Propane.[2] |
| Fuel equivalence ratio | 1.10 | 1.10 | 1.10 | 1.15 | 1.15 | 1.20. |
| Oxygen ratio | 0.17 | 0.21 | .023 | 0.21 | 0.21 | 0.21. |
| Total gas rate, s.c.f./m | 10.0 | 12.6 | 13.0 | 12.5 | 12.6 | 12.6. |
| Film speed, ft./min | 30 | 30 | 30 | 200 | 50 | 50. |
| Residence time in flame, sec | 0.33 | 0.33 | 0.33 | 0.025 | 0.10 | 0.10. |
| Length of unimpeded primary envelope, mm | 4.2 | 3.5 | 3.2 | 3.5 | 3.5 | 3.5. |
| Film-to-burner distance, mm | 6.0 | 5.0 | 4.5 | 5.0 | 5.5 | 5.5. |
| Back-up roll water temp.,° C. in/out | 45/53 | 45/53 | 45/53 | 45/47 | 45/51 | 45/51. |
| Evaluation: Boil rating* | 13 | 15 | 11 | 7 | 14 | 11. |

*Cumulative at end of one week; maximum possible=16.
**Contained 3.0% by weight of a polymeric ortho-hydroxybenzophenone.
See footnotes 1, 2, 3, Table I.

Table III

| Controls | A | B | C | D | E | F | G |
|---|---|---|---|---|---|---|---|
| Film description | NP White | NP White | NP White | NP White | NP Gray | NP Gray | NP White. |
| Thickness, mils | 1.0  1.5 | 1.0  1.5 | 1.0  1.5 | 1.0  1.5 | 1.0  1.5 | 1.0  1.5 | 1.0  1.5. |
| Hydrocarbon fuel | Propane [2] | Propane [2] | Propane [1] | Propane [1] | Propane [2] | Ethylene | Propane.[1] |
| Fuel equivalence ratio | *0.95* | *1.00* | *1.30* | 1.10 | 1.10 | *0.14* | *0.265*. |
| Oxygen ratio | 0.21 | 0.21 | 0.21 | 0.21 | 0.21 | 0.10 | 1.10. |
| Total gas rate, s.c.f./m | 12.5 | 12.5 | 12.5 | 12.5 | 12.5 | 10.0 | 16.0. |
| Film speed, ft./min | 50 | 50 | 100 | 200 | 100 | 200 | 200. |
| Residence time in flame, sec | 0.10 | 0.10 | 0.05 | 0.025 | 0.05 | 0.025 | 0.025. |
| Length of unimpeded primary envelope, mm. | 3.5 | 3.5 | 3.5 | 3.5 | 3.5 | 4.5 | 2.9. |
| Film-to-burner distance, mm | 5.5 | 5.5 | 5.5 | 5.5 | *2.9* | 5.5 | 4.5. |
| Back-up roll water temp.,° C. in/out | 45/51 | 45/51 | 45/48 | *25/28* | 45/49 | 45/46 | 45/48. |
| Evaluation: Boil Rating* | 0   3 | 2   2 | 0   3 | 1   4 | 2   5 | 2   4 | 1   3. |

*Cumulative at end of one week; maximum possible=16.
See footnotes 1, 2, Table I.

Both clear and pigmented polyvinyl fluoride films, the former preferably containing a small proportion by weight of an ultraviolet light screening agent and the latter ranging from esthetically decorative translucency to virtually complete opacity, readily and economically treated in accordance with the process of this invention can be successfully employed in the manufacture of polyvinyl fluoride film-clad, fiber-reinforced polyester structures among which are many that are exposed outdoors to the ravages of weathering either continually or at least intermittently during their use life. Among such structures may be included boat hulls and superstructure, life rafts and their containers, automobile bodies and detachable hard-tops, radar canopies and other antennae housing, rain shelters, aircraft radomes, harbor and channel buoys, outdoor walk-in telephone booths, horse trailers, aircraft wing and empennage tips, floral window boxes, luggage trailers, some contour furniture, swimming pools, forms for reinforced concrete, geodesic domed structures such as barns, auditoriums, etc., storage tanks for water and chemicals, house trailers, baby carriages, skis, sleds, toboggans, safety helmets, luggage, helicopter rotor blades, surfboards, highway and building signs, pipe lines and tanks for transport of liquids, cargo van bodies, agricultural animal trailers and in the construction of housing and other buildings in the form of roofings and sidings, battens, soffits, doors and window sash, skylights, awnings, flashing, rain gutters, downspouts, and overhead garage doors.

We claim:

1. A process for rendering the surface of polyvinyl fluoride film directly bondable to glass fiber-reinforced polyester structures to form hydrolytically stable-bond structures which comprises in combination the sequential steps of: (1) bringing a surface of polyvinyl fluoride film continuously into intimate contact with a moving, relatively highly thermally conductive surface maintained at a temperature effective to bring the film passing thereover to a bulk temperature within the range of from 40° C. to 135° C.; (2) passing said film while in contact with said surface through the stable, self-sustaining flame of a burner disposed parallel to said film and transversely of the direction of travel thereof, said burner being supplied with a gaseous mixture consisting essentially of a hydrocarbon fuel, oxygen and nitrogen, said fuel being selected from the group consisting of paraffinic and olefinic hydrocarbons, the fuel equivalence ratio of said gaseous mixture ranging from 1.05 to 1.20, the oxygen ratio of said gaseous mixture ranging from 0.15 to 0.25, the distance from the surface of the film to the discharge opening of said burner being greater than the length of the unimpeded primary envelope of said flame, said thermally conductive surface opposite the flame being maintained at said temperature within the range of from 40° C. to 135° C., the exposure of the film to the action of said flame being for a time between 0.01 second and 0.5 second; and (3) maintaining said film in contact with said moving, relatively highly thermally conductive surface for a time after passage of said film through said flame.

2. The process of claim 1 wherein the polyvinyl fluoride film is biaxially oriented polyvinyl fluoride film.

3. The process of claim 1 wherein the fuel equivalence ratio is within the range of 1.08 to 1.15 and the oxygen ratio is 0.21.

References Cited in the file of this patent

UNITED STATES PATENTS

| 2,648,097 | Kritchever | Aug. 11, 1953 |
| 2,683,894 | Kritchever | July 20, 1954 |
| 2,795,820 | Grow et al. | June 18, 1957 |